United States Patent
Doctor et al.

(10) Patent No.: US 12,111,716 B2
(45) Date of Patent: *Oct. 8, 2024

(54) DEVICE AND METHOD FOR EFFICIENT TRANSITIONING TO AND FROM REDUCED POWER STATE

(71) Applicant: Advanced Micro Devices, Inc., Santa Clara, CA (US)

(72) Inventors: Mihir Shaileshbhai Doctor, Santa Clara, CA (US); Alexander J. Branover, Boxborough, MA (US); Benjamin Tsien, Santa Clara, CA (US); Indrani Paul, Austin, TX (US); Christopher T. Weaver, Boxborough, MA (US); Thomas J. Gibney, Boxborough, MA (US); Stephen V. Kosonocky, Fort Collins, CO (US); John P. Petry, San Diego, CA (US)

(73) Assignee: Advanced Micro Devices, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/304,849

(22) Filed: Apr. 21, 2023

(65) Prior Publication Data

US 2023/0350484 A1    Nov. 2, 2023

Related U.S. Application Data

(63) Continuation of application No. 17/483,698, filed on Sep. 23, 2021, now Pat. No. 11,703,937.

(51) Int. Cl.
*G06F 1/32* (2019.01)
*G06F 1/3234* (2019.01)
*G06F 1/3287* (2019.01)
*G06F 1/3296* (2019.01)

(52) U.S. Cl.
CPC .......... *G06F 1/3287* (2013.01); *G06F 1/3265* (2013.01); *G06F 1/3278* (2013.01); *G06F 1/3296* (2013.01)

(58) Field of Classification Search
CPC .... G06F 1/3287; G06F 1/3265; G06F 1/3278; G06F 1/3296

See application file for complete search history.

(56) References Cited

U.S. PATENT DOCUMENTS

| | | |
|---|---|---|
| 7,039,819 B1 | 5/2006 | Kommrusch et al. |
| 2008/0229130 A1 | 9/2008 | Guan et al. |
| 2013/0031388 A1 | 1/2013 | Sakarda |
| 2013/0061077 A1 | 3/2013 | Han et al. |
| 2016/0048191 A1 | 2/2016 | Machnicki et al. |
| 2016/0246355 A1 | 8/2016 | Dannenberg et al. |
| 2018/0059756 A1 | 3/2018 | Gallimore et al. |

*Primary Examiner* — Stefan Stoynov
(74) *Attorney, Agent, or Firm* — Volpe Koenig

(57) ABSTRACT

A processing device and method for efficient transitioning to and from a reduced power state is provided. The processing device comprises a plurality of components having assigned registers used to store data to execute a program and a power management controller, in communication with the plurality of components. The power management controller receives an indication that the plurality of components are idle, executes a process to enter a component into a reduced power state in response to receiving an acknowledgement from the component of a request from the power management controller to remove power to the component, and executes a process to exit the component from the reduced power state in response to the component being active.

20 Claims, 8 Drawing Sheets

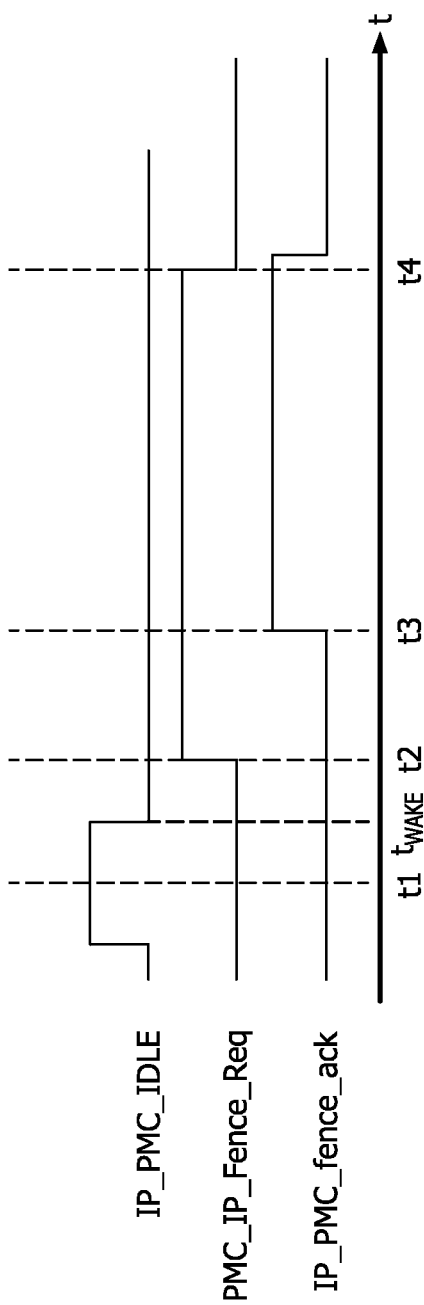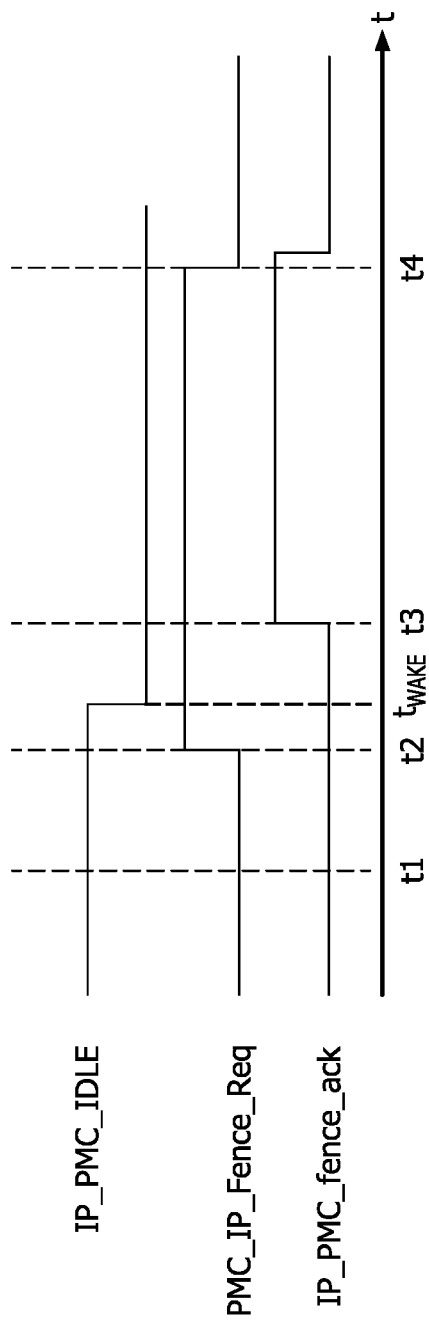

DEVICE AND METHOD FOR EFFICIENT TRANSITIONING TO AND FROM REDUCED POWER STATE

CROSS REFERENCE TO RELATED APPLICATION

This application is a continuation of U.S. patent application Ser. No. 17/483,698, filed Sep. 23, 2021, which is incorporated by reference as if fully set forth.

BACKGROUND

Computing systems are increasingly integrating large numbers of different types of components on a single chip or on multi-chip modules. The complexity and power consumption of a device increases with the number of different types of components. Power management is an important aspect of the design and operation of integrated circuits, especially circuits that are integrated within devices which typically rely on battery power, such as mobile devices. Reducing power consumption in the integrated circuits of these devices can increase the life of the battery as well as decrease the heat generated by the integrated circuits.

BRIEF DESCRIPTION OF THE DRAWINGS

A more detailed understanding can be had from the following description, given by way of example in conjunction with the accompanying drawings wherein:

FIG. 8A is a timing diagram illustrating an example of receiving an indication in time to abort entry into a reduced power state according to features of the present disclosure; and FIG. 8B is a timing diagram illustrating another example of receiving an indication in time to abort entry into a reduced power state according to features of the present disclosure.

DETAILED DESCRIPTION

Figure 1:
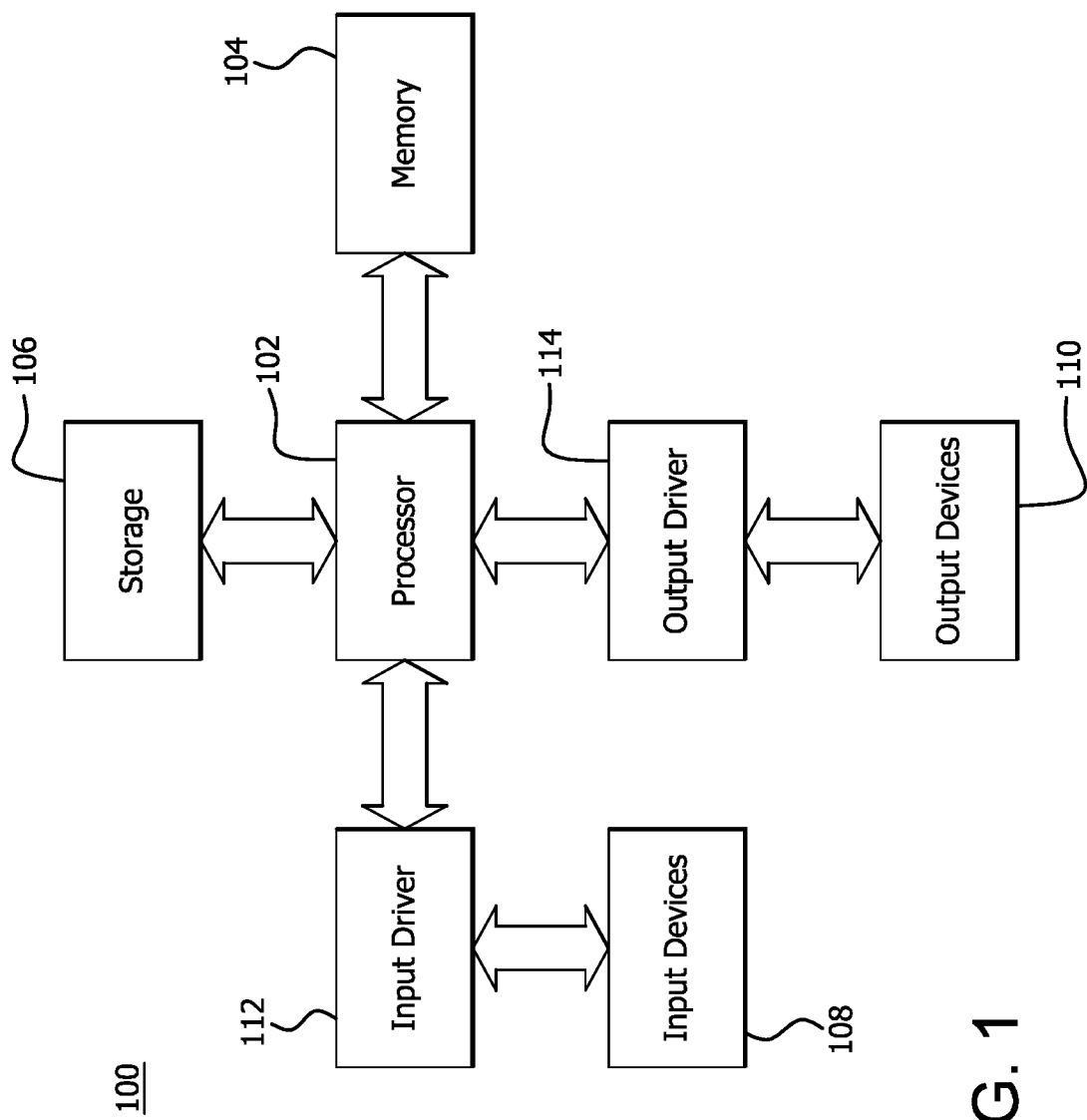
FIG. 1 is a block diagram of an example device in which one or more features of the disclosure can be implemented.

Some conventional devices reduce power consumption by entering a reduced power state (i.e., a power-gating state), which is a state in which a device or one or more components of the device are operating in a mode which consumes less power than another operating mode. For example, the power that would ordinarily be used to retain a present power state is removed from one or more components to enter the power-gating state and consume less power. A reduced power state is entered, for example, by turning off or removing power to a component, or alternatively, reducing a power supply voltage and/or reducing a clock frequency supplied to a component.

Prior to entering a reduced power state, a configuration register state is saved to memory (e.g., dynamic random-access memory (DRAM)). A configuration register state refers to the values stored in a plurality of configuration registers, assigned to a component of a device, which identify the component, define various features of the component, and allow system software to interface with and/or control the operation of the component. The operating system, device drivers, and diagnostic software typically access the configuration register state during operation of the given component. Upon exiting the reduced power state, the configuration register state is restored. Saving and restoring the configuration register state of the component causes the component to operate the same way before power is removed and after power is restored and prevents the occurrence of computing errors resulting from incorrect data being stored during execution.

In some reduced power states (e.g., shallower reduced power states, power is supplied to one or more components having configuration register states to be saved and restored. In other deeper reduced power states, power is not supplied to these components and the components are unable to function and communicate data between each other. For simplified explanation purposes, examples described herein include 11 power states referred to herein as Z0 (or S0) through Z10 power states. Features of the present disclosure can be implemented, however, for any number of power states. As described in more detail below, during an active power state (i.e., Z0/S0 power state), power is provided to each of the domains of the device and the Z1-Z10 reduced power states progress from shallower reduced power to deeper reduced states, respectively. That is, in the shallower reduced power states, a portion of the registers (e.g., registers corresponding to the components in the Z9 domain) are saved and restored while a remaining portion of the registers are not saved and restored. In the deeper reduced power states, however, the portion of the registers, corresponding to the powered on components in the shallower state, are not saved because these components are not active in the deeper reduced power states.

For example, during the Z9 reduced power state, power (e.g., voltage) is supplied to the display (e.g., the display controller), but is not supplied to other components (e.g., CPU, GPU and memory controller). During the Z10 reduced power state, power is not supplied to the display controller or these other components of the device. During operation of the device, these components can become idle for short intervals of time. For example, when a user is viewing a display, but the device is not receiving any user input for short periods of time (e.g., time periods between keystrokes), components (e.g., CPU, GPU and memory controller) become idle during these short periods of time. During these short periods of idle time, power consumption of the device can be reduced by transitioning to the Z9 power state and removing power supplied to these components.

Conventional systems detect the idleness (i.e., idle or not idle) of a component via software and are not able to restore power and exit a reduced power state until after a period of 10 ms or longer has expired since the component became active (i.e., no longer idle). Accordingly, these conventional systems are not able to efficiently transition between these reduces power states for these short periods of idle time (e.g., time periods between keystrokes).

Features of the present disclosure provide efficient transitioning between different reduced power states for short idleness windows. Features of the disclosure efficiently identify, via unique hardware, the idleness of one or more components of a device. A power management controller identifies (e.g., via a wake signal), the idleness of one or more components and implements a handshaking process (e.g., fence requests and fence acknowledgement) with the components to efficiently transition between power states. When one or more components of a device are identified as no longer being idle prior to receiving an acknowledgement of a fence request, entry into a reduced power state is aborted. When one or more components of a device are identified as no longer being idle after receiving an acknowledgement of a fence request, power is restored to the components and the device enters the power state in which power is supplied to the components (e.g., S0 or Z0 power state) in 1 ms or less from the time at which the one or more components were identified as no longer being idle. Accordingly, the overall power consumption is reduced and battery life of the device is increased.

In addition, the power management controller efficiently provides indications to platform components (e.g., an embedded controller for monitoring temperature and controlling a device fan) that a device is entering a reduced power state and to stop performing one or more functions to further reduce power consumption. For example, when the power management controller determines that the device is to enter a deeper reduced power state (e.g., Z10 power state), the power management controller efficiently provides an indication to the embedded temperature and fan controller to stop monitoring a temperature of the device to further reduce power consumption.

A processing device is provided which comprises a plurality of components having assigned registers used to store data to execute a program and a power management controller, in communication with the components. The power management controller is configured to send one of a request to remove power to the components and a request to reduce power to the components when it is determined that the components are idle, execute a first process of one of removing power and reducing power to the components and entering a reduced power state when an acknowledgement of the request is received and execute a second process of restoring power to the components when one or more of the components are indicated to be active.

A method of power state transitioning is provided which comprise sending, by a power management controller in communication with a plurality of components, one of a request to remove power to the components and a request to reduce power to the components when it is determined that the components are idle, executing, by the power management controller, a first process of one of removing power and reducing power to the components and entering a reduced power state when an acknowledgement of the request is received and executing, by the power management controller, a second process of restoring power to the components when one or more of the components are indicated to be active.

A non-transitory computer readable medium is provided which comprises instructions for causing a computer to execute a method of power state transitioning. The instructions comprise sending, by a power management controller in communication with a plurality of components, one of a request to remove power to the components and a request to reduce power to the components when it is determined that the components are idle, executing, by the power management controller, a first process of one of removing power and reducing power to the components and entering a reduced power state when an acknowledgement of the request is received and executing, by the power management controller, a second process of restoring power to the components when one or more of the components are indicated to be active.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, one or more processor cores, wherein each processor core can be a CPU or a GPU, or a power management controller (PMC) used to manage different powers states of the device 100, such as reduced power states when the device 100 or a component of the device 100 is operating in a mode which consumes less power than a normal operating mode. In various alternatives, the memory 104 is be located on the same die as the processor 102, or is located separately from the processor 102. The memory 104 includes a volatile or non-volatile memory, for example, random access memory (RAM), dynamic RAM (DRAM), or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
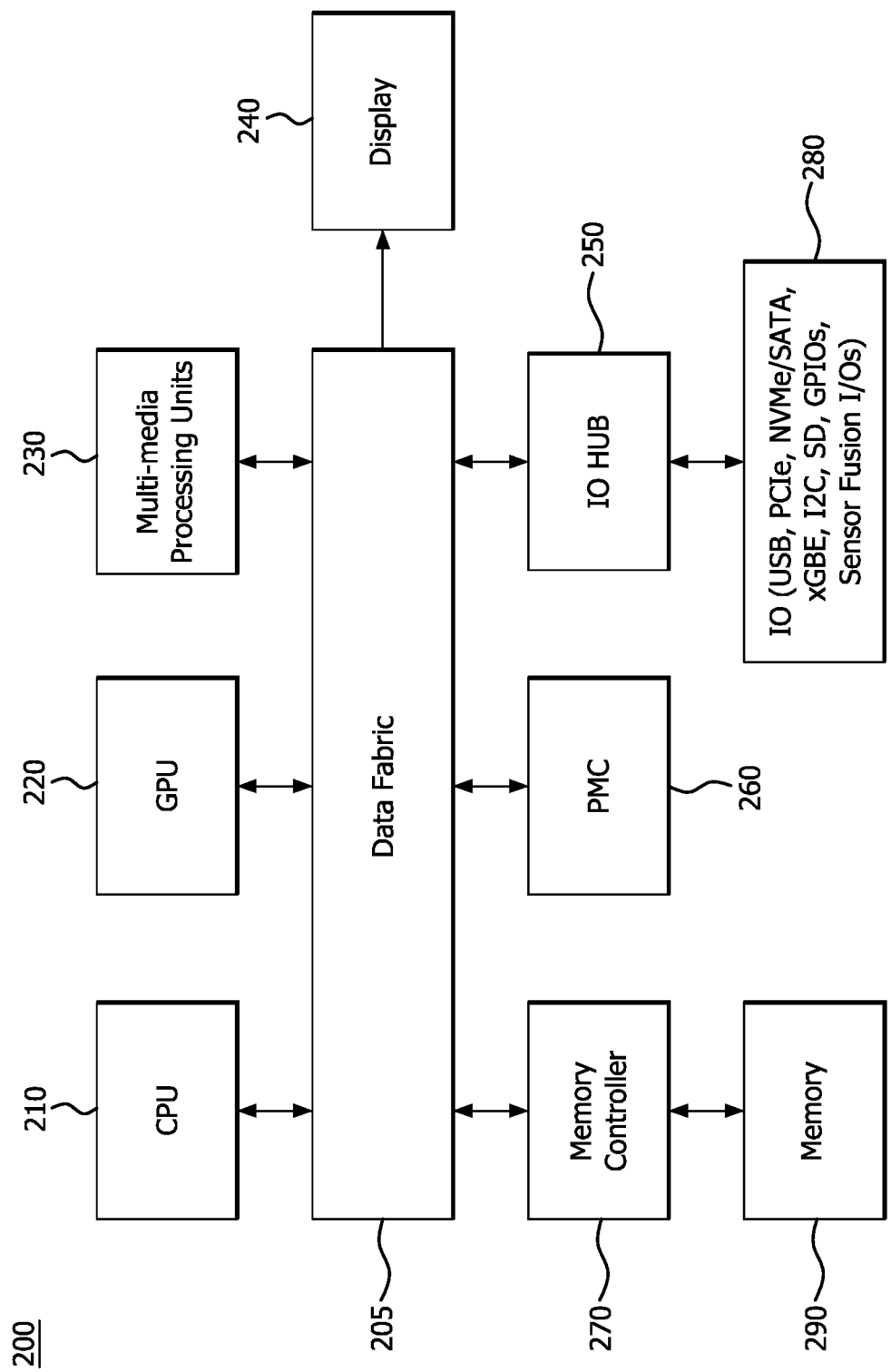
FIG. 2 is a block diagram illustrating example components, including a power management controller, for implementing one or more features of the disclosure.

FIG. 2 is a block diagram illustrating example components of a device 200, including PMC 260, for implementing one or more features of the disclosure. The components of the example device 200 include data fabric 205, which is representative of any type of communication fabric, bus, and/or other control and interface logic for communicating data between intellectual property (IP) components (referred to herein as "IP components) of a device. IP components include, for example, cores, hardware blocks, memory cells and logic used to execute various portions of a program or application. Data fabric 205 includes data paths, switches, routers, and other logic used to communicate data among the various IPs, such as CPU 210, GPU 220, multi-media processing units 230, display 240 (via a display controller 240 shown in FIG. 3), I/O hub 250 and memory controller 270. Data fabric 205 can be bus-based, including shared bus configurations, crossbar configurations, and hierarchical buses with bridges. Fabric 205 can also be packet-based, and can be hierarchical with bridges, crossbar, point-to-point, or other interconnects. The arrows in FIG. 2 show the data flow between the IP components of the device.

The components of the device 200 shown in FIG. 2 also include various I/O components 280, such as for example, a universal serial bus (USB) port, a peripheral component interconnect express (PCIe) bus, a NVMe controller, a general-purpose input/output (GPIO) controller and sensor fusion I/O components.

As described in more detail below with regard to FIG. 3, PMC 260 includes a combination of hardware and firmware and interfaces with the IP components (e.g., CPU 210, GPU 220, multi-media processing units 230, display 240, I/O hub 250, and memory controller 270) via IP component control interfaces and register bus interfaces (different from the data fabric interfaces used to communicate data between IP components) to manage the transitions (e.g., entry and exit) between different powers states of a device.

Figure 3:
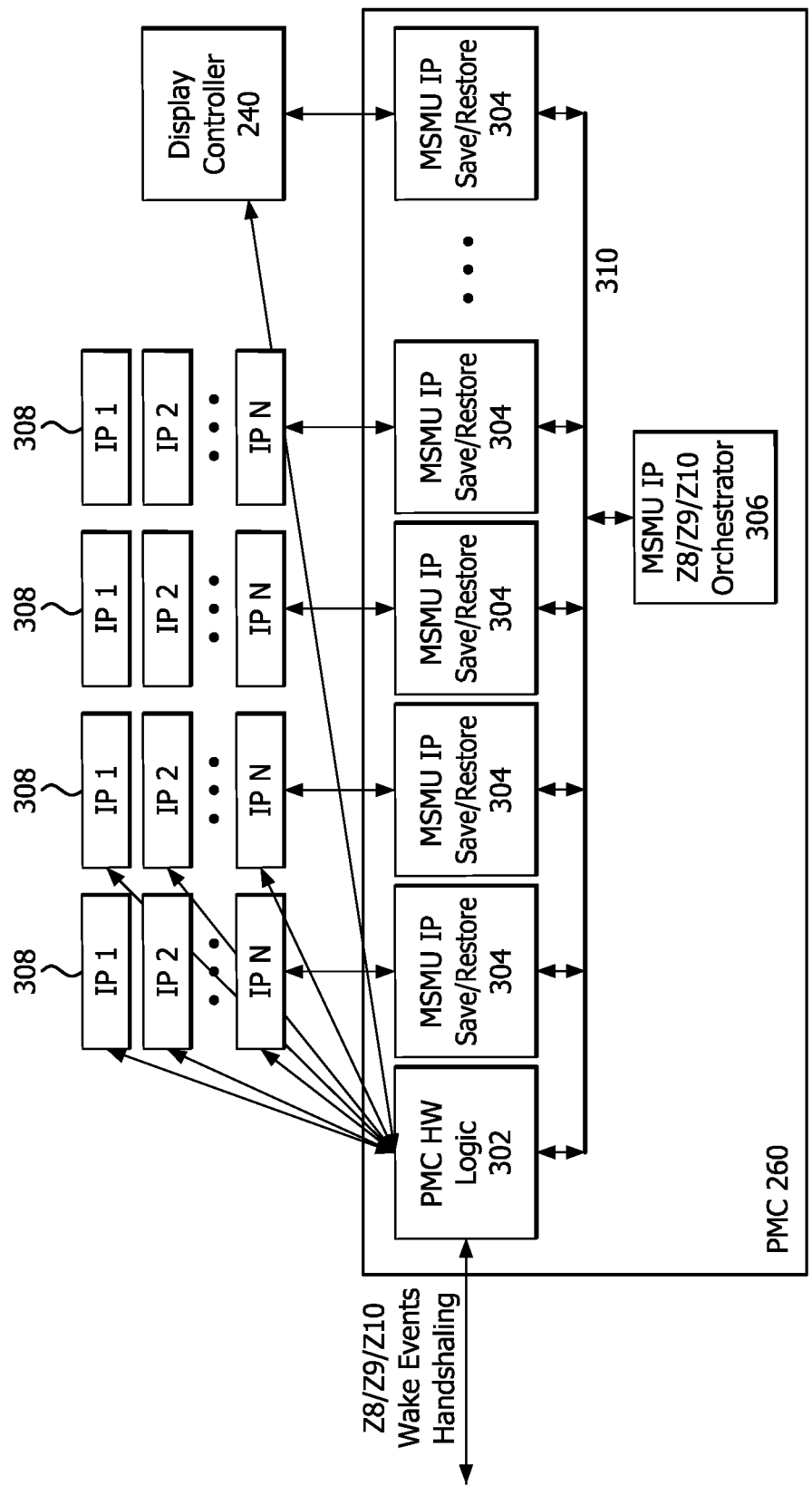
FIG. 3 is a block diagram illustrating the power management controller shown in FIG. 2 with additional detail.
Figure 5:
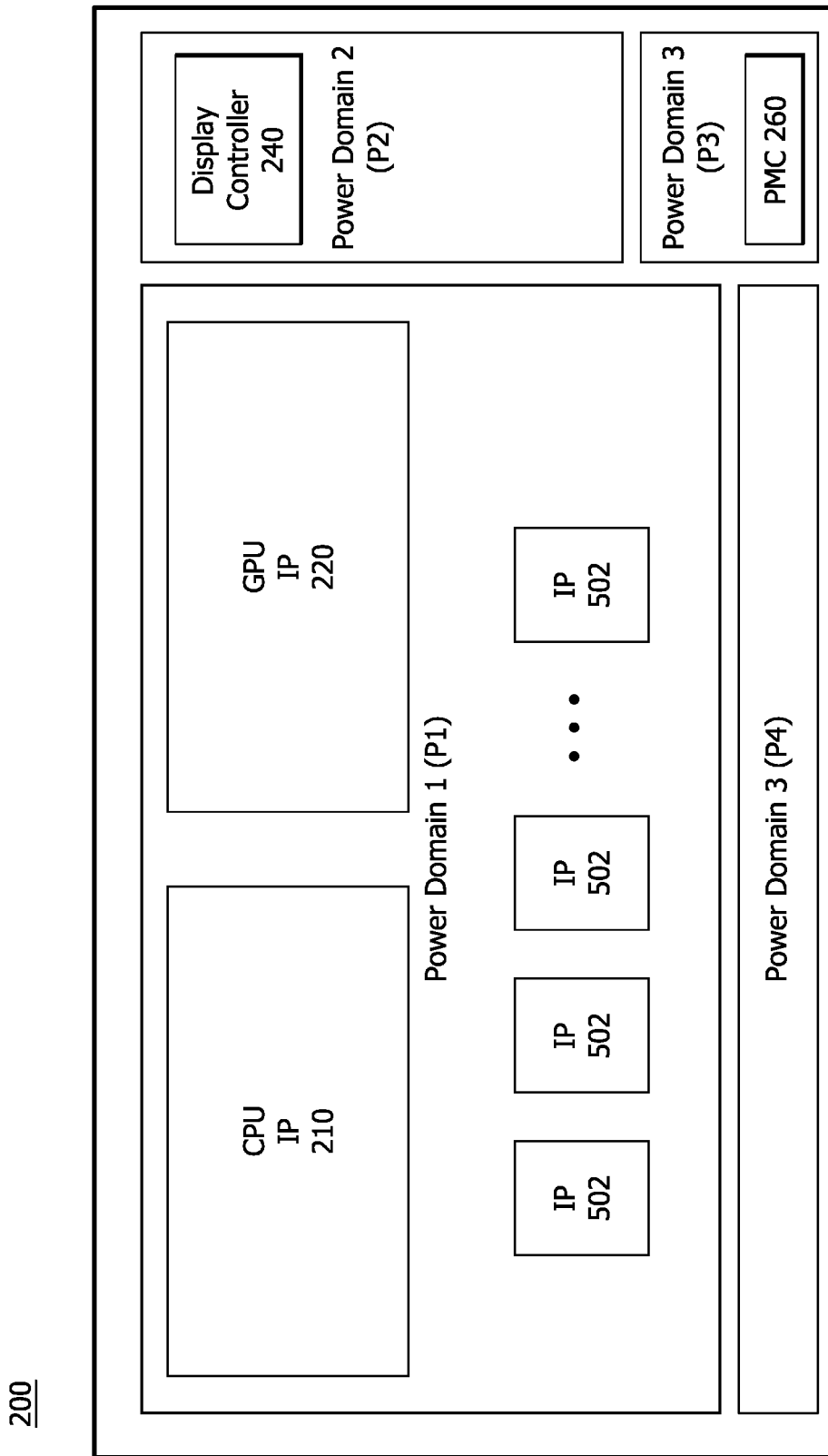
FIG. 5 is a block diagram illustrating different power domains of an example device in which one or more features of the disclosure can be implemented.

FIG. 3 is a block diagram illustrating components of PMC 260 in communication with a plurality of IP components 308. As shown in FIG. 3, the PMC 260 includes PMC hardware (HW) logic 302, IP Save/Restore middle system management units (MSMUs) 304, and main MSMU 306. PMC HW logic 302 is a hardware block (i.e., logic circuitry) which interfaces with IP components 308 (in the P1 and P2 power domains as shown in FIG. 5) according to an IP/PMC interface protocol. For example, the PMC HW logic 302 receives idleness indications (e.g., wake event) of whether one or more of the IP components 308 are idle or are not idle (i.e. active) and performs handshaking (e.g., sends fence requests to one or more IP components 308 and receives fence acknowledgements from the one or more IP components 308).

Figure 4:
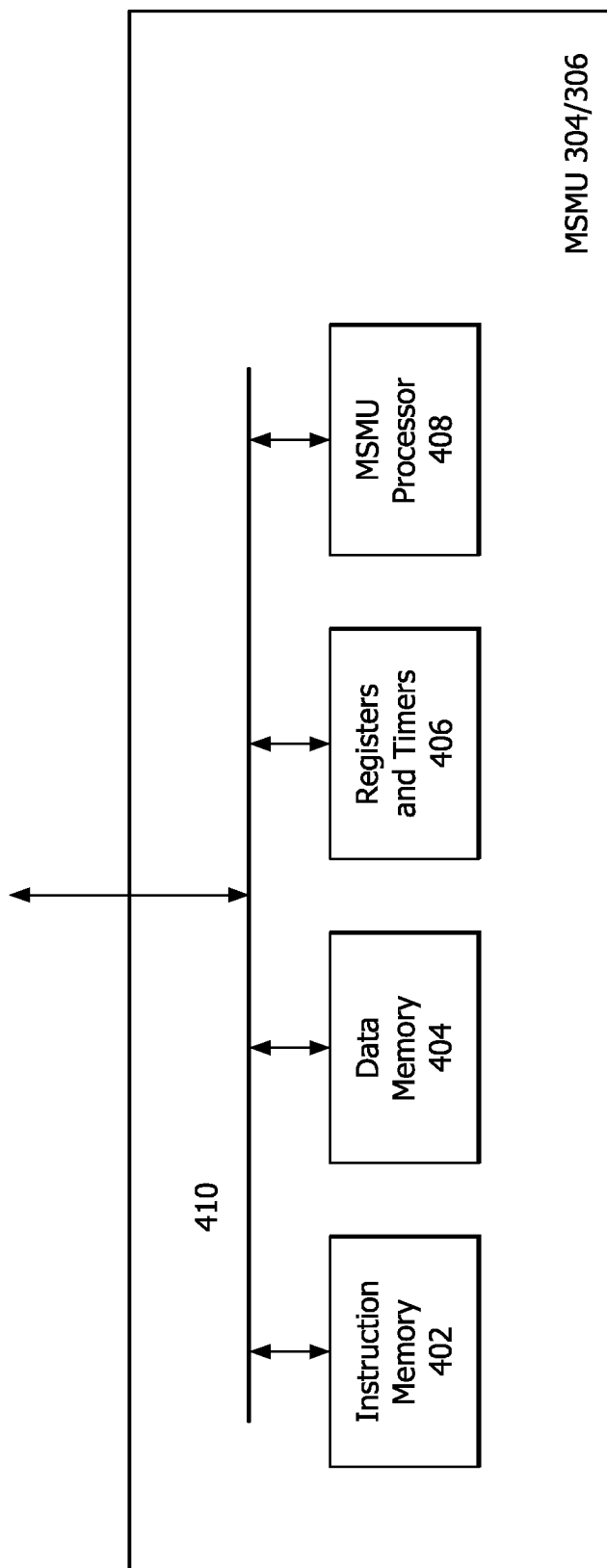
FIG. 4 is a block diagram illustrating components of a middle system management unit for implementing one or more features of the disclosure.

FIG. 4 is a block diagram illustrating components of the MSMUs 304 and 306 shown in FIG. 3. As shown in FIG. 4, the MSMUs 304 and 306 include instruction memory 402, data memory 404, registers and timers 406, instruction processor 408 and MSMU bus 410. The IP Save/Restore MSMUs 304 operate in parallel to save register data of corresponding IP components 308 in their data memory 404 and restore the register data to corresponding IP components 308 from their data memory 404.

Each MSMU processor 408 executes firmware instructions in its instruction memory 402 to save and restore the register data for its corresponding IP components 308. The instruction memory 402 includes a limited set of firmware instructions (e.g., 16 instructions) which are used to efficiently implement the register save-restore traffic (e.g., meet target latency periods between a time in which one or more IP components 308 becomes active (i.e., not idle) and a time to restore one or more IP components 308 the device 200 to an active state. The data memory 404 includes static random access memory (SRAM) which is used to store data used by a corresponding IP component 308 to execute a portion of a program. The data is saved to the data memory 404 from configuration registers assigned to an IP component 308 when exiting a power state of the device 200 and restored (e.g., reloaded) to the configuration registers when entering a power state of the device 200.

The main MSMU 306 communicates with the IP Save/Restore MSMUs 304 and PMC HW logic 302 via PMC bus 310 and includes firmware instructions which are used to manage the IP Save/Restore MSMUs 304 and orchestrate the implementation of the register save-restore traffic between the IP Save/Restore MSMUs 304 and their corresponding IP components 308.

FIG. 5 is a block diagram illustrating the different power domains of the example device 200. As shown in FIG. 5, the IP components in the first power domain (P1) include CPU 210, GPU 220 and other IP components 502, such as for example multi-media processing units 230, I/O hub 250, and memory controller 270. The second power domain (P2) includes display controller 240. The third power domain (P3) includes PMC 260. The fourth power domain includes other components of device 200, such as I/O components 280.

The power states of the device 200 include, for example, 11 states ranging from Z0 (also referred to as state S0) to Z10. Features of the present disclosure can be implemented, however, for any number of power states. During the S0/Z0 power state, power is provided to each of the domains (e.g., each power rail is ON). During the Z1-Z7 states, one or more, but not each of the IP components are idle. During the Z8 and Z9 power states, CPU 210, GPU 220 and IP components 502 are idle. During the Z8 state, power (e.g., voltage) supplied to the P1 power domain is reduced. During the Z9 state, power is not supplied (i.e., power is OFF) to the P1 power domain. During the Z10 state, power is not supplied to the P1 and P2 power domains.

Figure 6:
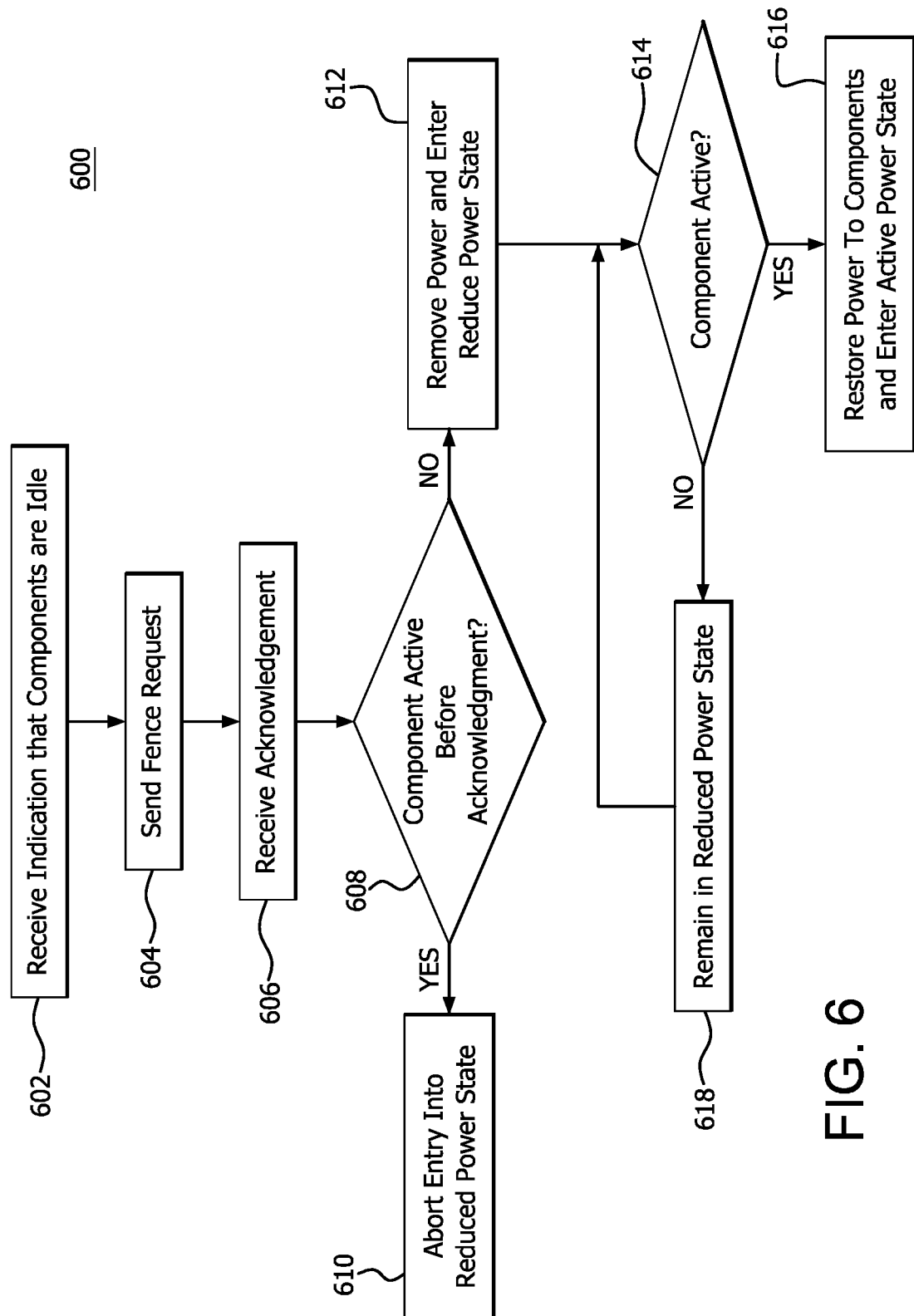
FIG. 6 is a flow diagram illustrating an example method of power state transitioning according to features of the present disclosure.

FIG. 6 is a flow diagram illustrating an example method 600 of power state transitioning according to features of the present disclosure. For simplified explanation, the method 600 is described, by way of example, of transitioning between a Z9 reduced power state and a Z10 reduced power state and include a request to remove the power supplied to components of a device and the removal of the power supplied to components to enter the deeper reduced power state. Features of the present disclosure can be implemented, however, by transitioning between any of the reduced power states and can also include a request to reduce an amount of power supplied to components and reducing the amount of power supplied to the components to enter the deeper reduced power state.

As shown at block 602, the method 600 includes receiving an indication that each of the components of a device are idle. For example, while in the Z9 reduced power state, the hardware logic 302 of the PMC 260 receives an indication that each of the IP components 308, including display controller 240, are idle, which begins the entry process into the Z10 reduced power state.

As shown at block 604, the method 600 includes sending a request to remove power to the components of the device. For example, PMC 260 sends fence requests to each of the IP components 308, requesting permission to remove power to the IP components 308. The fence requests also provide an indication to each of the IP components 308 that they should stop sending communications to the other IP components 308.

As shown at block 606, the method 600 includes receiving an acknowledgement of the fence requests. For example, PMC 260 receives an acknowledgement, by each of the IP components 308, permitting PMC 260 to remove power from the IP components 308.

As shown at decision block 608, the method 600 includes determining whether one or more of the IP components 308 are indicated to be active before or after receiving the acknowledgement of the request to remove power to the components. When it is determined that one or more of the IP components 308 are indicated as being active (i.e., no longer idle) prior to receiving the acknowledgement of the request to remove power to the components (YES decision), the method 600 proceeds to block 610 and entry into the reduced power state is aborted. For example, when PMC HW logic 302 receives a wake event, indicating that the one or more IP components 308 are active, prior to receiving an acknowledgement of the request to remove power, PMC 260 does not save register data of IP components 308 and does not enter into the reduced power state.

When it is determined that one or more of the IP components 308 are indicated as being active (i.e., no longer idle) after to receiving the acknowledgement of the request to remove power to the components (NO decision), entry into the reduced power state power state cannot be aborted and the device enters the reduced power state at block 612. For example, when PMC HW logic 302 receives a wake event after receiving the acknowledgement of the request to remove power, PMC 260 saves the register data of the IP components 308 in the data memory 404 of corresponding MSMUs 304 and power is removed from the IP components 308 (and display controller 240 when entering the Z10 state) and the device enters the reduced power state.

As shown at decision block 614, the method 600 includes determining whether one or more of the IP components 308 are indicated to be active. An indication that one or more of the IP components 308 are active (i.e., no longer idle) can be received during the time period when PMC 260 is saving the register data of the IP components 308 or after power is removed (i.e., while in the reduced power state). As described above, however, when the indication (i.e., wake event) is received while the PMC 260 is saving the register data (i.e., before power is removed), the device still enters the reduced power state because the indication is received after the acknowledgement of the request. When it is determined that one or more of the IP components 308 are indicated as being active, the method proceeds to block 616, power is restored to the IP components 308 and the device enters an active power state (e.g., S0 or Z0 power state in which power is supplied to each of the IP components 308). When it is not determined that one or more of the IP components 308 are indicated as being active, the device remains in the reduced power state at block 618, and the PMC 260 continues to wait until an indication is received that one or more of the IP components 308 are active. In addition, due to the unique hardware of the PMC 260 and the IP/PMC interface protocol, after receiving the acknowledgement of the request to remove power, the PMC 260 restores power to the IP components 308 and the device enters the active power state in 1 millisecond (ms) or less from the time when the one or more components 308 were determined as being active (no longer being idle), regardless of when the indication is received that the one or more of the IP components 308 are active. That is, the device enters the active power state in 1 millisecond (ms) or less from the time when the indication is received, regardless of whether the indication is received during the time period when the register data is being saved or while in the reduced power state). Accordingly, the overall power consumption is reduced and battery life of the device is increased.

Figure 7:
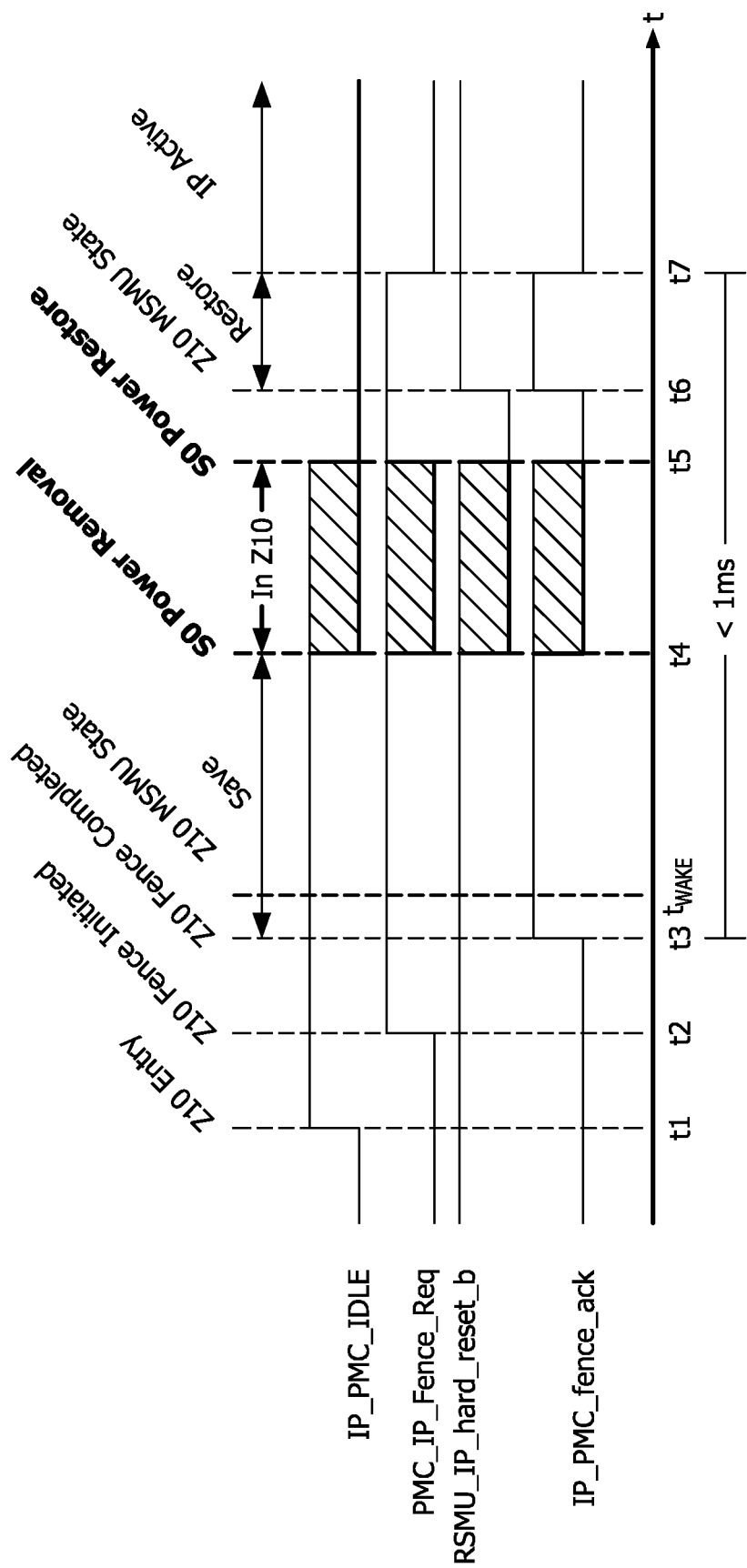
FIG. 7 is a timing diagram illustrating transitioning between reduced power states according to features of the present disclosure.

FIG. 7 is a timing diagram illustrating an example of transitioning between reduced power states according to features of the present disclosure. The example shown at FIG. 7 includes a transition from the Z9 reduced power state to the Z10 reduced power state and a transition from the Z10 reduced power state to the active power state (i.e., S0 power state or Z0 power state). Features of the present disclosure can be implemented, however, for transitioning between power states different from those shown in FIG. 7.

The PMC 260 receives a plurality of different indications for implementing transitions between power states. For example, the PMC 260 receives separate indications from each of a plurality of IP components (e.g., IP components 308) regarding the idleness (idle or not idle) of each corresponding IP component 308. For simplification purposes, however, a single idleness indication signal (i.e., IP_PMC_idle) is shown in FIG. 7 to represent the combined idleness of the IP components 308. That is, when IP_PMC_idle indication is high, each of the IP components 308 are idle. When IP_PMC_idle indication is low, one or more of the IP components 308 are not idle (i.e., active).

The PMC 260 also implements a handshaking process between the IP components 308. For example, PMC 260 sends fence requests to each of the IP components 308 and receives fence acknowledgements from each of the IP components 308. For simplification purposes, however, a single fence request (PMC_IP_fence_req) is shown in FIG. 7 to represent the fence requests sent to each of the IP components 308 and a single fence acknowledgement (IP_PMC_fence_ack) is shown in FIG. 7 to represent the fence acknowledgements sent to each of the IP components 308.

The PMC 260 also uses a power reset signal (i.e., RSMU_IP_hard reset_b) to reset the power to each of the IPs of the device 200. As shown in the example in FIG. 7, when RSMU_IP_hard reset_b goes from high to low, the reset is applied such that power is restored to each of the IP components 308.

In the example shown at FIG. 7, prior to time t1, the PMC 260 is in the Z9 power state in which power is not supplied (i.e., power is OFF) to the IP components in the P1 power domain (e.g., CPU 210, GPU 220 and IP components 502 in FIG. 5). For example, prior to time t1, PMC 260 received idleness indications from the IP components in the P1 power domain and implemented the process for entering the Z9 power state.

At time t1, IP_PMC_idle goes high. That is, the PMC 260 receives an indication that each of the IP components 308, including the display controller 240, are idle and the PMC 260 begins the entry process into the Z10 reduced power state. At time t2, the PMC 260 issues a fence request (IP_fence_req) to each of the IP components 308, requesting permission from each of the IP components 308 to remove power to the IP components 308. The fence requests also provide an indication to each of the IP components 308 that they should stop sending communications to the other IP components 308.

At time t3, IP_fence_ack goes high, indicating an acknowledgement, by each of the IP components 308 to the PMC 260, of the fence request (IP_fence_req) and permitting the PMC 260 to remove power supplied to the IP components 308. The PMC 260 saves the configuration register state of the IP components 308 between time t3 and time t4 and removes power to the IP components 308 at time t4. Accordingly, the device 200 operates in the Z10 reduced power state between time t4 and time t5. When the PMC 260 receives an indication that one or more components 308 are no longer idle, power is restored to the IP components 308 at time t5, the configuration register state of the IP components 308 are restored at time t6 and the device exits the reduced power state at time t7.

The PMC 260 aborts entry into the Z10 power state when the PMC 260 receives an indication that one or more of the IP components 308 are no longer idle (i.e., active) prior to time t3. For example, FIG. 8A and FIG. 8B are timing diagrams illustrating different examples of receiving an indication in time to abort entry into a reduced power state. In FIG. 8A, PMC 260 receives an indication (e.g., a wake signal), at time $t_{WAKE}$ between time t1 and time t2, that one or more of the IP components 308 are no longer idle. Accordingly, IP_PMC_idle goes low at time $t_{WAKE}$. At time t4, the fence request (IP_fence_req) goes low, entry into the Z10 power state is aborted and power is not removed. The fence acknowledgement (IP_fence_ack) goes low shortly after time t4. In FIG. 8B, PMC 260 receives an indication (e.g., a wake signal) at time $t_{WAKE}$ between time t2 and time t3, that one or more of the IP components 308 are no longer idle. Accordingly, at time $t_{WAKE}$ the IP_PMC_idle goes low. At time t4, the fence request (IP_fence_req) goes low, entry into the Z10 power state is aborted and power is not removed.

When the PMC 260 receives an indication (e.g., a wake signal) that one or more of the IP components 308 are no longer idle after time t3 (i.e., the point of no return at which time the acknowledgment of the fence request and permission to remove power is received), entry into the Z10 power state cannot be aborted at time t4 and the device enters the Z10 reduced power state. But due to the unique hardware of the PMC 260 and the IP/PMC interface protocol, the PMC 260 restores power to the IP components 308 and the device enters an active power state (e.g., S0 or Z0 power state) in which power is supplied to the components 308 in 1 ms or less from the time when the one or more components 308 were identified as no longer being idle. Accordingly, the overall power consumption is reduced and battery life of the device is increased.

For example, as show in FIG. 7, the PMC 260 receives an indication (e.g., a wake signal) after time t3, at time $t_{WAKE}$, that one or more of the IP components 308 are no longer idle, entry into the Z10 power state cannot be aborted at time t4 and the device enters the Z10 reduced power state. But due to the unique hardware of the PMC 260 and the IP/PMC interface protocol, the period of time between time $t_{WAKE}$ (the time when the one or more components 308 are identified as no longer being idle and time t5 (the time when the RSMU_IP_hard reset_b goes low to reset the power to the IP components 308) is reduced such that the period of time between time $t_{WAKE}$ an time t7 (the time when the device enters the active power state) is 1 ms or less.

The time $t_{WAKE}$ shown in FIG. 7 is merely an example. The PMC 260 is configured to reset the power to the IP components 308 (at time t7) such that the period of time is 1 ms or less between the time ($t_{WAKE}$) when the PMC 260 receives an indication that one or more of the IP components 308 are no longer idle and the time (time t7) when the device enters the active power state, regardless of when PMC 260 receives the indication that one or more of the IP components 308 are no longer idle.

The various functional units illustrated in the figures and/or described herein (including, but not limited to, the processor 102, the input driver 112, the input devices 108, the output devices 110, the output driver 114, data fabric 205, CPU 210, GPU 220, memory controller 270 and PMC 260 may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A processing device comprising:
   a plurality of components having assigned registers used to store data to execute a program; and
   a power management controller, in communication with the plurality of components, and configured to:
      receive an indication that the plurality of components are idle;
      execute a process to enter a component into a reduced power state in response to receiving an acknowledgement from the component of a request from the power management controller to remove power to the component; and
      execute a process to exit the component from the reduced power state in response to the component being active.

2. The processing device of claim 1, wherein the power management controller is configured to abort execution of the process to enter the component into the reduced power state in response to the component being active prior to receiving the acknowledgement of the request to remove power to the component.

3. The processing device of claim 1, wherein the power management controller is configured to execute the process to exit the component from the reduced power state in a time period of 1 millisecond or less from a time when the component is indicated to be active after receiving the acknowledgement of the request.

4. The processing device of claim 1, wherein the power management controller comprises hardware logic circuitry configured to send the request to remove power to the component and receive the acknowledgement of the request.

5. The processing device of claim 1, wherein the power management controller is further configured to:
   save data in one or more registers assigned to the component in response to the component being entered into the reduced power state; and
   restore data in the one or more registers assigned to the component in response to the component being exited from the reduced power state.

6. The processing device of claim 5, wherein the process to enter the component into the reduced power state includes saving data in the one or more registers assigned to the component in memory associated with the power management controller.

7. The processing device of claim 5, wherein the process to exit the component from the reduced power state includes saving data in memory associated with the power management controller in the one or more registers assigned to the component.

8. The processing device of claim 1, wherein the plurality of components include any one or a combination of the following components: a central processing unit (CPU); a graphics processing unit (GPU); a multi-media processing unit; a display controller; an input/output (I/O) hub; or a memory controller.

9. The processing device of claim 1, wherein the reduced power state includes reducing power to the component or removing power from the component.

10. A method for performing power state transitioning in a processing device comprising a plurality of components, the method comprising:
receiving, by a power management controller, an indication that the plurality of components are idle;
executing, by the power management controller, a process to enter a component into a reduced power state in response to receiving an acknowledgement from the component of a request from the power management controller to remove power to the component; and
executing, by the power management controller, a process to exit the component from the reduced power state in response to the component being active.

11. The method of claim 10, further comprising aborting execution of the process to enter the component into the reduced power state in response to the component being active prior to receiving the acknowledgement of the request to remove power to the component.

12. The method of claim 10, wherein the executing the process to exit the component from the reduced power state occurs in a time period of 1 millisecond or less from a time when component is indicated to be active after receiving the acknowledgement of the request.

13. The method of claim 10, further comprising:
saving data in one or more registers assigned to the component in response to the component being entered into the reduced power state; and
restoring data in the one or more registers assigned to the component in response to the component being exited from the reduced power state.

14. The method of claim 13, wherein the process to enter the component into the reduced power state includes saving data in the one or more registers assigned to the component in memory associated with the power management controller.

15. The method of claim 13, wherein the process to exit the component from the reduced power state includes saving data in memory associated with the power management controller in the one or more register assigned to the component.

16. The method of claim 10, wherein the component is any one of the following components: a central processing unit (CPU); a graphics processing unit (GPU); a multi-media processing unit; a display controller; an input/output (I/O) hub; or a memory controller.

17. The method of claim 10, wherein the reduced power state includes reducing power to the component or removing power from the component.

18. A non-transitory computer-readable medium comprising instructions that, when executed by a processing device comprising a plurality of components, cause the processing device to perform operations for performing power state transitioning, the operations comprising:
receiving an indication that the plurality of components are idle;
executing a process to enter a component into a reduced power state in response to receiving an acknowledgement from the component of a request to remove power to the component; and
executing a process to exit the component from the reduced power state in response to the component being active.

19. The non-transitory computer-readable medium of claim 18, wherein the operations further comprise aborting execution of the process to enter the component into the reduced power state in response to the component being active prior to receiving the acknowledgement of the request to remove power to the component.

20. The non-transitory computer-readable medium of claim 18, wherein the executing the process to exit the component from the reduced power state occurs in a time period of 1 millisecond or less from a time when the more component is indicated to be active after receiving the acknowledgement of the request.

* * * * *